United States Patent
Ravishankar

(10) Patent No.: US 6,806,336 B2
(45) Date of Patent: Oct. 19, 2004

(54) PROCESS FOR POLYMERIZING ETHYLENE, HIGHER ALPHA-OLEFIN COMONOMER AND DIENES, ESPECIALLY VINYL NORBORNENE; POLYMERS MADE USING SUCH PROCESSES; AND ARTICLES MADE FROM SUCH POLYMERS

(75) Inventor: Periagaram S. Ravishankar, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/464,926

(22) Filed: Jun. 18, 2003

(65) Prior Publication Data

US 2003/0236363 A1 Dec. 25, 2003

Related U.S. Application Data

(60) Provisional application No. 60/389,980, filed on Jun. 19, 2002.

(51) Int. Cl.$^7$ ................................................ C08F 10/00
(52) U.S. Cl. ................ 526/284; 526/335; 526/348; 526/348.6; 526/339; 526/90; 526/170; 526/237
(58) Field of Search .................... 526/284, 335, 526/348, 348.6, 339, 90, 170, 237

(56) References Cited

U.S. PATENT DOCUMENTS

| | | | |
|---|---|---|---|
| 3,629,212 A | 12/1971 | Benedikter et al. | 260/80.78 |
| 3,674,754 A | 7/1972 | Cameli et al. | 260/79.5 B |
| 4,016,342 A | 4/1977 | Wagensommer | 525/65 |
| 4,306,041 A | 12/1981 | Cozewith et al. | 526/65 |
| 4,510,303 A | 4/1985 | Oda et al. | 526/282 |
| 5,003,019 A | 3/1991 | Ishimaru et al. | 526/281 |
| 5,008,356 A | 4/1991 | Ishimaru et al. | 526/281 |
| 5,674,613 A | 10/1997 | Dharmarajan et al. | 428/378 |
| 5,698,651 A | 12/1997 | Kawasaki et al. | 526/336 |
| 6,207,756 B1 | 3/2001 | Datta et al. | 525/191 |
| 6,225,426 B1 | 5/2001 | Gillis et al. | 526/160 |
| 6,281,316 B1 | 8/2001 | Wasserman et al. | 526/282 |
| 6,319,998 B1 | 11/2001 | Cozewith et al. | 526/65 |
| 2003/0162926 A1 * | 8/2003 | Wouters et al. | 526/335 |

FOREIGN PATENT DOCUMENTS

| | | | |
|---|---|---|---|
| EP | 0 059 034 A1 | 9/1982 | C08F/210/16 |
| EP | 0 227 206 B2 | 7/1987 | C08F/210/18 |
| EP | 0 751 156 A2 | 1/1997 | C08F/210/18 |
| EP | 0 784 062 A2 | 7/1997 | C08F/10/02 |
| EP | 0 843 702 B1 | 6/1999 | C08L/23/16 |
| EP | 0 843 698 B1 | 8/1999 | C08L/23/16 |
| EP | 0 843 701 B1 | 8/1999 | C08L/23/16 |
| EP | 1088 855 A1 | 4/2001 | C08L/21/00 |
| WO | WO 97/00288 | 3/1997 | C08L/23/16 |
| WO | WO 98/02471 A1 | 1/1998 | C08F/210/18 |
| WO | WO 99/00434 A1 | 1/1999 | C08F/210/18 |
| WO | WO 99/45047 A1 | 9/1999 | C08F/210/18 |
| WO | WO 99/45062 A1 | 9/1999 | C08L/23/02 |

* cited by examiner

Primary Examiner—William K. Cheung

(57) ABSTRACT

This invention relates to olefin polymerization processes for polymerizing ethylene, higher alpha-olefin comonomer and dienes, especially vinyl norbornene, and especially process for producing amorphous or semi-crystalline polymers such as EPDM. The invention also relates to the novel polymers produced by such processes. The invention furthermore relates to articles of manufacture with an improved balance of toughness and curing properties.

11 Claims, No Drawings

PROCESS FOR POLYMERIZING ETHYLENE, HIGHER ALPHA-OLEFIN COMONOMER AND DIENES, ESPECIALLY VINYL NORBORNENE; POLYMERS MADE USING SUCH PROCESSES; AND ARTICLES MADE FROM SUCH POLYMERS

This application claims the benefit of U.S. Provisional Application No. 60/389,980, filed Jun. 19, 2002, the entire disclosure of which is hereby incorporated by reference.

FIELD

This invention relates to olefin polymerization processes for polymerizing ethylene, higher alpha-olefin comonomer and dienes, especially vinyl norbornene, and especially processes for producing amorphous or semi-crystalline polymers such as EPDM. The invention also relates to the novel polymers produced by such processes. The invention furthermore relates to articles of manufacture with an improved balance of toughness and curing properties.

BACKGROUND

EPDM's containing vinyl norbornene (VNB), which is a non-conjugated diene having two polymerizable double bonds, are known from EP843698; EP843702 and EP843701. These polymers have long chain branching (LCB). High levels of LCB improve processability, but may impair physical properties (tear) of final product after conversion of the polymer by extrusion or molding etc. The two double bonds are both capable of polymerization with olefins in the presence of transition metal catalysts.

The prior art describes the benefit of VNB over ethylidene norbornene (ENB). ENB is a non-conjugated diene having one double bond that is copolymerizable using a transition metal catalyst. The other double bond is not so polymerizable and remains available in the final polymer for subsequent reaction, e.g., sulfur curing. The VNB derived EPDM provides improved cure rate and performance in free-radical curing, improved processability from the highly branched structure and requires a low level of diene to provide suitable physical properties in the final product comparable to ENB derived EPDM.

WO99/00434 describes combining ENB, VNB and specific branching inhibitors to produce EPDM with reduced branching. The ENB derived units are present in amounts well in excess of the amount of VNB. The spectrum of LCB and MWD variations that can be obtained appear to be limited by the process characteristics (a branching modifier is used). Very low levels of branching may be hard to obtain because of cationic branching generated by the ENB. Broad molecular weight distribution is favored.

In the present invention, an alternative method is used for controlling LCB, which permits greater reliance on the non-conjugated diene type which has two polymerizable double bonds, such as VNB. In this alternative method no, or much less, ENB can be used. Thus the benefits described for prior art EPDM polymers derived predominantly from VNB as the diene can be obtained, with the added benefit of balancing the influence of LCB on processing and the properties of the final product.

This method relies not on chemical branching modifiers, but on the predominant addition of the VNB (or equivalent diene having two polymerizable double bonds) in a second polymerization reaction step under polymerization conditions which allow for controlled incorporation of the VNB.

It is known to make EPDM type polyolefins, generally those having ENB derived units, in a continuous stirred tank series reactor layout, primarily to obtain broader molecular weight distributions and the attendant processability benefits resulting therefrom. Reference is made to U.S. Pat. No. 4,306,041; EP227206 and WO99/45047; WO99/45062 discusses polymer dispersions. The production of an EPDM product containing predominantly units of VNB for the diene so as to control levels of LCB is not described.

U.S. Pat. No. 6,319,998 and WO 99/45062 describe processes using metallocene type catalysts that have high activity and extremely efficient incorporation of diene. This leads to high levels of LCB, and in some cases the formation of gel. The process described herein employs a catalyst capable of controlling VNB incorporation so as to limit LCB formation.

For additional background see: WO 99/00434, U.S. Pat. No. 6,207,756, WO 98/02471, U.S. Pat. No. 3,674,754, U.S. Pat. No. 4,510,303 U.S. Pat. No. 3,629,212, U.S. Pat. No. 4,016,342, U.S. Pat. No. 5,674,613, EP 1088855, U.S. Pat. No. 6,281,316, EP 784062, U.S. Pat. No. 4,510,303, U.S. Pat. No. 5,698,651 and U.S. Pat. No. 6,225,426.

SUMMARY

The present invention relates to a process for solution polymerizing ethylene, higher alpha-olefin and diene having two polymerizable double bonds which comprises: A) reacting in a first step ethylene, higher alpha-olefin comonomer and optionally one or more dienes to produce a polymer composition comprising from 0 to less than 1 mol % of diene having one or two polymerizable double bonds, in the presence of a catalyst system;

reacting in a second step ethylene, higher alpha-olefin comonomer and one or more dienes at least one of which is a diene having two polymerizable double bonds in the presence of a catalyst system, the amount of diene having two polymerizable double bonds being added to the reactor in the second step being more than 50% of the total diene added in the first and second step combined; and C) recovering a polymer product having from 0.02 to 2 mol % of units derived from the diene having two polymerizable double bonds, and a branching index of greater than 0.5.

In one embodiment, the present invention relates to a process for solution polymerizing ethylene, propylene and diene having two polymerizable double bonds which comprises: A) reacting in a first step ethylene, propylene and optionally one or more dienes to produce a polymer composition comprising from 0 to less than 1 mol % of diene having one or two polymerizable double bonds, in the presence of a vanadium based catalyst system; B) reacting in a second step ethylene, higher alpha-olefin comonomer and diene comprising vinyl norbornene in the presence of the same catalyst system, the amount of vinyl norbornene added in the second step being more than 50% of the total diene added in the first and second step combined; and C) recovering a polymer product having from 0.1 to 1 mol % of units derived from vinyl norbornene and a total of no more than 5 mol % diene derived units, from 50 mol % to 90 mol % ethylene derived units and a balance of propylene derived units; a branching index of greater than 0.5, preferably greater than 0.7 and a Mooney viscosity of from 15ML to 100 MST.

This invention further relates to a polymer product which comprises in combination: a) from 50 to 90 mol % of ethylene derived units ; b) from 0.1 to 2 mol % of VNB derived units; c) an optional amount of ENB derived units; d) a balance of higher alpha olefin derived units; and e) a branching index of greater than 0.5.

More specifically this invention relates to a polymer product which comprises in combination: a) from 50 to 90 mol % of ethylene derived units; b) from 0.1 to 1 mol % of VNB derived units; c) an optional amount of ENB derived units; d) a balance of propylene derived units; e) a branching index of greater than 0.5, preferably greater than 0.7; and f) a Mooney viscosity of from 15 ML to 100 MST. Articles made from such polymers are also described.

DETAILED DESCRIPTION

The polymer compositions of this invention comprise units derived from ethylene, alpha-olefin and diene having two polymerizable double bonds. Such "EPDM-type" polymers are well known in the art. The alpha olefin is preferably one or more $C_3$ to $C_8$ alpha olefins, more preferably propylene or butene, most preferably propylene.

The diene having two polymerizable double bonds is preferably selected from the group consisting of: 1,4-hexadiene, 1,6 octadiene, 5-methyl-1,4-hexadiene, 3,7-dimethyl-1,6-octadiene, dicyclopentadiene (DCPD), norbornadiene, 5-vinyl-2-norbornene (VNB), and combinations thereof, most preferably VNB. The amount of diene having two polymerizable double bonds in the polymer product may vary from 0.2 to 2 mol %, preferably from 0.1 to 1 mol %, more preferably from 0.1 to 0.5 mol %. Other dienes may be added during the polymerization process. All ranges disclosed herein are inclusive unless otherwise noted.

In a preferred embodiment, the maximum amount of ethylene derived units is 90 mol %, preferably from 50 to 90 mol %. Ethylene content is determined by FTIR, ASTM D3900, and is not corrected for diene content. ENB or VNB content incorporated in the polymer is determined by FTIR, ASTM D6047. Other dienes can be measured via 1H NMR. These methods only measure available unsaturation. Thus the measured incorporation may be lower than the actual incorporation because dienes having pendant unsaturated moities have been converted, e.g., by hydrogen, are not detected in the measurement. When both ENB and VNB are present, $^{13}$C NMR should be used to determine diene content The polymers of this invention preferably have a Mooney viscosity of 15 ML to 100 MST, more preferably from 20 ML to 80 MST determined as described below.

As used herein Mooney viscosity is measured as ML (1+4) at 125° C. in Mooney units according to ASTM D-1646. However, Mooney viscosity values greater than about 100 cannot generally be measured under these conditions. In this event, a higher temperature can be used (i.e. 150° C.), with eventual longer shearing time (i.e. 1+8 @ 125 or 150° C.), but more preferably, the Mooney measurement is carried out using a non-standard small rotor as described below.

The non-standard rotor design is employed with a change in Mooney scale that allows the same instrumentation on the Mooney machine to be used with higher Mooney polymers. This rotor is termed MST—Mooney Small Thin. One MST point is approximately 5 ML points when MST is measured at (5+4 @200 C) and ML is measured at (1+4@125° C.).

ASTM D1646-99 prescribes the dimensions of the rotor to be used within the cavity of the Mooney machine. This prescription allows a large and a small rotor differing only in diameter. These are referred to as ML (Mooney Large) and MS (Mooney Small). However, EPDM can be produced at such high MW that the torque limit of the Mooney machine can be exceeded using these standard prescribed rotors. In these instances, the test is run using the MST rotor that is both smaller in diameter and thinner. Typically when the MST rotor is employed, the test is also run at different time and temperature. The pre-heat time is changed from the standard 1 minute to 5 minutes and the test is run at 200 C instead of the standard 125 C. Thus, the value will be reported as MST (5+4), 200 C. Note that the run time of 4 minutes at the end of which the Mooney reading is taken remains the same as the standard conditions. For the purposes of an approximate conversion between the two scales of measurement, multiply the MST (5+4) 200 C. Mooney value by 5 to obtain the ML(1+4) 125 C equivalent. The MST rotor should be prepared as follows:

The rotor should have a diameter of 30.48+/−0.03 mm and a thickness of 2.8+/−0.03 mm (tops of serrations) and a shaft of 11 mm or less in diameter.

The rotor should have a serrated face and edge, with square grooves of 0.8 mm width and depth of 0.25–0.38 mm cut on 1.6 mm centers. The serrations will consist of two sets of grooves at right angles to each other (form a square crosshatch).

The rotor is positioned in the center of the die cavity such that the centerline of the rotor disk coincides with the centerline of the die cavity to within a tolerance of +/−0.25 mm. A spacer or a shim may be used to raise the shaft to the midpoint.

The wear point (cone shaped protuberance located at the center of the top face of the rotor) shall be machined off flat with the face of the rotor.

For blends of polymers, the Mooney viscosity is obtained using the relationship shown in Equation 1 below.

$$\text{Log } ML = n_A \log ML_A + n_B \log ML_B \qquad \text{(Equation 1)}$$

Where all logarithms are to the base 10.

ML is the Mooney viscosity of a blend of two polymers A and B each having individual Mooney viscosities $ML_A$ and $ML_B$, respectively. The fraction of polymer A in the blend is $n_A$, while the fraction of the polymer B is $n_B$. In the present application, Equation (1) has been used to generate blends of high Mooney polymer (A) with a low Mooney polymer (B) that have measurable Mooney viscosities under (1+4 @ 125° C.) conditions. Knowing ML, $ML_A$ and $n_A$, $ML_B$ can be easily calculated.

For high Mooney polymers, $ML_A$ is conveniently measured using the MST rotor as described above. In this work, we have found the following correlation: ML (1+4 @ 125° C.)=5.13*MST (5+4 @ 200° C.).

The polymers of this invention are not highly branched, therefore, the branching index is at least 0.5, more preferably at least 0.7, even more preferably at least 0.9, The relative degree of branching in ethylene, alpha-olefin, diene monomer elastomeric polymers is determined using a branching index factor (BI). Calculating this factor requires a series of three laboratory measurements of polymer properties in solutions as disclosed in VerStrate, Gary, "Ethylene-Propylene Elastomers", Encyclopedia of Polymer science and Engineering, 6, $2^{nd}$ edition (1986). These are:

$M_{w, \ GPC \ LALLS}$, weight average molecular weight measured using a low angle laser light scattering (LALLS) technique in combination with Gel Permeation Chromatography (GPC) (ii) weight average molecular weight ($M_{w, \ DRI}$) and viscosity average molecular weight ($M_{v, \ DRI}$) using a differential refractive index (DRI) detector in combination with GPC and (iii) intrinsic viscosity (IV) measured in decalin at 135° C. The first two measurements (i and ii) are obtained in a GPC using a filtered dilute solution of the polymer in trichlorobenzene.

An average branching index (i.e., branching index as used herein) is defined as:

$$BI = \frac{M_{v,br} \times M_{w,DRI}}{M_{w,GPC\,LALLS} \times M_{v\,GPC\,DRI}}$$

where, $M_{v,br}=(IV/k)^{1/a}$; and 'a' is the Mark-Houwink constant (=0.759 for ethylene, propylene diene elastomeric polymers in decalin at 135° C.). From equation (1) it follows that the branching index for a linear polymer is 1.0. For branched polymers, the extent of branching is defined relative to the linear polymer. Since at a constant number average molecular weight $M_n$, $(M_W)_{branch} > (M_W)_{linear}$, BI for branched polymers is less than 1.0, and a smaller BI value denotes a higher level of branching. In place of measuring IV in decalin, it is also acceptable to measure IV using a viscosity detector in tandem with DRI and LALLS detectors in the so-called GPC-3D instrument. In this case, 'k' and 'a' values appropriate for the GPC solvent should be used in the equation above.

Any number and type of additives may be compounded with the polymer compositions of this invention including but not limited to: carbon black, plasticizer like paraffinic oil, process aids such as fatty acids, waxes etc., antioxidants, curatives, fillers such as calcium carbonate, clay, silica and the like, antiozonants, tackifiers, and scorch inhibiting agents.

These polymer compositions may be cured or vulcanized according to known methods, for example using agents such as peroxide that forms a C—C bond or hydrosilation that forms a C—Si—C bond as is described in "Vulcanization", Chapter 7 of "Science and Technology of Rubber", by A. Y. Coran, (F. R Eirich editor) Academic Press Inc., 1978.

Generally speaking, any process may be used to prepare the polymers of this invention including single and parallel reactors or by mechanical blending. The preferred process, though, is that of this invention which employs the use of two steps, preferably in series reactors, as described below.

Process control and efficiency is best achieved when operating in a series reactor arrangement in which the solution resulting from the first step is supplied as the feed stream, with optional added monomer, to the second step. Preferably the process steps are performed with sufficient back mixing so as to eliminate concentration gradients in the bulk of the reactors and ensure random polymerization by using at least two continuous stirred tank reactors.

The contribution from the first reactor step is preferably major. Advantageously the first step in the upstream reactor produces at least 80 wt % and/or less than 95 wt % of the total polymer, preferably at least 90 wt %.

Low levels of LCB in the final product can be obtained by controlling the participation of the pendent double bond during polymerization. Preferably the diene supplied to the first step is less than half that supplied in the second step so as to reduce LCB formation.

By minimizing the participation of the diene having two copolymerizable double bonds in the first step and by reducing or eliminating the participation of the pendent double bond of the diene in the polymerization during the second step, low or very low levels of LCB formation can be created. LCB formation can be minimized via choice of catalyst system, reactor temperature, catalyst rates and the like.

The catalyst system (i.e., active catalyst or catalyst plus activator with or without support) may be any catalyst system capable of producing the target polymer product in a two (or more) step reaction process. We have found that vanadium based catalyst systems as opposed to metallocene based catalyst systems tend to be capable of doing this. In our experience, the commonly known and used metallocene type catalyst systems are too active and too efficient at incorporating the VNB pendant vinyl group. This leads to LCB and gel formation rather than to the product of the present invention. We do, however, contemplate that selected metallocenes might behave more like vanadium based catalyst systems and prove useful in the process of this invention.

Preferably a vanadium based catalyst system is selected from vanadium tetra chloride/aluminum sesquichloride (co-catalyst) type and vanadiumoxytrichloride/aluminum sesquichloride catalyst systems so as to provide an improved propensity for incorporating higher alpha olefins.

Given the ability to produce very low levels of LCB by using one or more of the measures indicated previously, it may be desirable to produce polymers having properties intermediate those having very low levels of LCB and the highly branched products made with, for example VNB, until now. For such purposes a copolymerizable, diene containing two polymerizable double bonds may be added in the first step but in an amount of less than 50% of the total added of the diene containing two polymerizable double bonds. It may also be desired without departing from the inventive concept to add a copolymerizable, diene containing only one polymerizable double bond, in the first step to increase sulfur curable unsaturation along the polymer chain.

The overall monomer composition of the polymer can range broadly. Preferably the polymer contains 50 to 90 mol % of ethylene derived units, more preferably from 50 to 80 mol % ethylene derived units, from 0.1 to 5 mol % of one or more diene derived units as determined by FT-IR/HNMR wherein the higher alpha olefin forms the balance and has from 3 to 8 carbon atoms and comprises preferably propylene. In a preferred form the polymer contains at least 50 mol % of the total diene of VNB derived units, preferably from 0.1 to 1 mol % of the total polymer, more preferably from 0.1 to 0.5 mol %, which VNB derived units have a pendant double bond available for cross-linking. The polymer may have overall a Mooney of from 15 ML to 100 MST, in the absence of Mooney lowering extender oils. Molecular weight can be controlled conventionally including the option of adding hydrogen.

ENB may be added during polymerization, preferably to the first reactor in order to obtain a sulfur curable polymer. Generally, to impart sulfur curability, from 0.5 to 10 mol % ENB is preferably added.

Because of the differential monomer addition CD may be broadened to a great degree. Preferably the polymer has an Mw/Mn<6 and/or an Mz/Mw<5.

Specifically, EPDM with VNB as a diene is generally prepared in a single Continuous Flow Stirred Tank Reactor (CFSTR) in a temperature range of 20–65° C., a pressure of 50–200 PSI (350–1400 kPa) and residence time of 5–15 minutes.

Branching may be reduced to a controlled extent by differential feeding of the VNB so as to minimise the participation of pendent double bond.

The emphasis in the first step should be to produce either a copolymer or a terpolymer with just enough diene to provide the desired overall cure characteristics so LCB can be minimized. The emphasis in the second step should be on the introduction of the majority of VNB into the polymer chains with reduced LCB formation compared to the first step. The absolute level of VNB can be selected to obtain the desired curing properties. More VNB provides better curability.

According to embodiments of this invention, a range of LCB levels and cure properties can be provided through the use series reactor operation, in which the VNB is fed only or mainly to the second reactor. If the catalyst is fed only to the first reactor, very low catalyst concentration remains in the second reactor to produce a small fraction of the total polymer. Because this fraction produced in the second step can be kept small, ultra low propylene conversion can be targeted without undermining the polymerization efficiency appreciably while VNB is being incorporated. It is believed that the VNB incorporated in the second step undergoes minimal reaction of the pendent double bond, permitting formation of an overall linear polymer. The slight broadening of molecular weight distribution resulting from multi-step polymerization may enhance the processability of such a substantially linear polymer.

As used herein, molecular weight distribution Mw/Mn is determined according to well known methods, for example by GPC (Gel Permeation Chromatography) on a Waters 150 gel permeation chromatograph equipped with a differential refractive index (DRI) detector and a Chromatix KMX-6 on line light scattering photometer. The system is used at 135° C. with 1,2,4-trichlorobenzene as the mobile phase using Shodex (Showa Denko America, Inc) polystyrene gel columns 802, 803, 804 and 805. This technique is discussed in "Liquid Chromatography of Polymers and Related Materials III", J. Cazes editor, Marcel Dekker. 1981, p. 207, which is incorporated herein by reference. No corrections for column spreading are employed; however, data on generally accepted standards, e.g. National Bureau of Standards Polyethylene 1484 and anionically produced hydrogenated poly-isoprenes (an alternating ethylene-propylene copolymers) demonstrate that such corrections on Mw/Mn (=MWD) are less than 0.05 units. Mw/Mn is calculated from elution times. The numerical analyses are performed using the commercially available Beckman/CIS customized LALLS software in conjunction with the standard Gel Permeation package. Calculations involved in the characterization of polymers by $^{13}$CNMR follow the work of F. A. Bovey in "Polymer Conformation and Configuration" Academic Press, New York, 1969. Reference to Mw/Mn implies that the Mw is the value reported using the LALLS detector and Mn is the value reported using the DRI detector described above.

EXAMPLES

The two steps of the inventive process were accomplished by carrying out the polymerization in a series arrangement of two Continuous Flow Stirred Tank Reactors with hexane as the solvent. Vanadium tetra chloride was used as the catalyst and ethyl aluminum sesquichloride as the cocatalyst. The catalyst and co-catalyst were added only in the first step in a molar ratio of 5 to 1. The carryover of live catalyst species to the second tank provided the desired environment for the second step. The first step was carried out at 30° C. The temperature in the second step was dependent on the relative amount of polymer made in that step but, generally ranged from 34 to 37° C. The polysplit in terms of the proportion by weight of polymer made in the first step versus that made in the second step was in the range 87–95. The catalyst rate was adjusted to produce about 480–895 gm of polymer per gram of catalyst. The residence time in the reactor was maintained at 8.5 minutes. The polymer concentration in the solvent was between 2.5% and 2.8%. Propylene was fed only to the first step with carryover of unreacted portion providing the feed to the second step.

FIG. 1 shows that the propylene and VNB conversion are inversely proportional. High VNB conversion (in terms of VNB units incorporated into the polymer backbone with the second double bond intact) is obtained coincident with low propylene conversion (in terms of propylene units incorporated into the polymer backbone). This data suggests that the propensity to incorporate the double bond in the alpha olefin is about the same as the pendent double bond on VNB. Therefore, a reaction environment that would be poor for the incorporation of alpha olefin in the backbone of the polymer chain would also discourage the participation of the pendent double bond in polymerization and therefore produce a polymer with low levels of LCB formed by polymerization of the second double bond of VNB. Where it is the objective to maximize the contribution of VNB towards subsequent curing and where it is intended to minimize the contribution towards LCB formation, such as for example when VNB is added in a second reaction step, low propylene conversion is targeted Ethylene was fed to both steps separately. VNB was fed only to the second step. The conversion of ethylene in the first step was close to 100%. The overall ethylene utilization in the process was 79–97%. The conversion of propylene in the first step was 70–80%. The overall utilization of propylene was 72–93% as residual propylene is incorporated in the second step. The overall conversion of VNB based on available VNB in the polymer was from 8–21%.

Example 1 is for comparative purposes and was made without any VNB feed in both steps;

Example 2 was made with the addition of 2 Kg/hr VNB to the second step;

Example 3 was made with the addition of 6 Kg/hr VNB to the second step;

Example 4 was made with the addition of 7 Kg/hr VNB to the second step;

Example 5 was similar to Example 4 with additional catalyst feed in step 1; and

Example 6 is a comparative example made according to prior art in a single step process.

TABLE 1

| | Example 1 (not according to invention) | Example 2 | Example 3 | Example 4 | Example 5 | Example 6 (not according to invention) |
|---|---|---|---|---|---|---|
| ML (1 + 4) 125 C. | 57 | 62.3 | 65 | 79.2 | 41 | 85.8 |
| MLR | 208 | 245.7 | 269 | 552 | 265.2 | 1659 |
| Wt % C2 | 62.2 | 61.5 | 61.6 | 61.2 | 59.0 | 60.2 |
| Wt % VNB | 0 | 0.42 | 0.85 | 0.92 | 0.8 | 1 |
| Wt % C3 | 37.8 | 38.3 | 38.1 | 38.4 | 40.7 | 39.4 |
| Polysplit (%) | 87 | 93 | 92 | 89 | 91 | Single Reactor |
| Mw, Lalls/Mn, DRI | 1.95 | 2.10 | 2.38 | 2.09 | 2.26 | 8.62 |
| (Mz/Mw), Lalls | 1.50 | 1.64 | 2.14 | 1.72 | 1.91 | 3.85 |
| Branching Index | 0.95 | 0.91 | 0.83 | 0.89 | 0.83 | 0.41 |

The molecular weight distribution remains relatively narrow; the level of LCB is low as is evident from the high branching index of the Examples according to the invention which can approximate that of Example 1 which contains no VNB derived units.

The polymers were evaluated in a plasticizer-free black-filled formulation and vulcanized using a peroxide curative.

The formulation is shown in Table 2 and the cure and physical property data in Table 3.

TABLE 2

| Ingredient | Function | Amount in parts by wt of total |
|---|---|---|
| Polymer | Structural strength | 100 |
| N 550 | Processing Oil | 50 |
| Agerite Resin D | | 1 |
| Structol W34 | | 2 |
| Dicup 40 KE | | 6 |
| SR 350 (TMPTMA) | Anti-oxidant | 2 |

TABLE 3

| ODR @ 180 C. (320 F.), 3 deg arc | | Example 1 (not according to invention) | Example 2 | Example 3 | Example 4 | Example 5 | Example 6 (not according to invention) |
|---|---|---|---|---|---|---|---|
| ML | dNm | 29.0 | 31.4 | 30.0 | 33.7 | 15.9 | 36.1 |
| MH | dNm | 124.8 | 135.4 | 137.9 | 144.2 | 110.6 | 159.7 |
| ts2 | min | 0.6 | 0.6 | 0.5 | 0.6 | 0.6 | 0.6 |
| t50 | min | 1.5 | 1.6 | 1.5 | 1.5 | 1.7 | 1.7 |
| t90 | min | 3.3 | 3.4 | 3.4 | 3.5 | 4.0 | 3.6 |
| t98 | min | 5.1 | 5.1 | 5.3 | 5.3 | 5.9 | 5.6 |
| Rate | dNm/min | 63.1 | 63.5 | 67.4 | 71.4 | 58.3 | 71.1 |
| MH-ML | dNm | 95.7 | 104.0 | 107.9 | 110.5 | 94.7 | 123.5 |
| Press Cure, 10 min at 180 C. | | | | | | | |
| Hardness | Shore A | 72.0 | 72.0 | 73.0 | 78.0 | 73.0 | 75.0 |
| Tear Die C | lb/in | 6.1 | 5.0 | 4.5 | 4.3 | 4.6 | 2.8 |
| 50% Modulus | Psi | 318.9 | 320.9 | 384.9 | 425.3 | 347.0 | 422.5 |
| 100% Modulus | Psi | 515.7 | 582.1 | 774.4 | 851.4 | 627.1 | 1151.1 |
| 200% Modulus | Psi | 1240.7 | 1519.3 | 1895.5 | 2021.0 | 1501.7 | — |
| 300% Modulus | Psi | 2027.8 | — | — | — | — | — |
| Tensile Strength | Psi | 2350.5 | 2337.3 | 2131.6 | 2227.9 | 2035.8 | 2127.5 |
| Elongation | % | 352.5 | 290.6 | 222.6 | 219.8 | 260.5 | 155.6 |

The above described polymers may be used for vibration dampening devices, brake parts, hose compounds; extrusion profiles; power transmission belts, thermoplastic vulcanizates, where tear resistance tear strength, tensile strength, elongation at break and other toughness criteria are critical and excess LCB may have a negative impact on the final product properties.

While the present invention has been described in considerable detail with reference to certain preferred versions thereof, other versions are possible. Also, different types of members and configurations of members can be formed in accordance with the invention, in a number of different ways that will be apparent to persons having ordinary skill in the art. Therefore, the spirit and scope of the appended claims should not be limited to the description of the preferred versions contained herein.

All documents cited herein are fully incorporated by reference for all jurisdictions in which such incorporation is permitted and to the extent they are not inconsistent with this specification. All documents to which priority is claimed are fully incorporated by reference for all jurisdictions in which such incorporation is permitted. Although dependent claims have single dependencies in accordance with U.S. practice, each of the features in any of the dependent claims can be combined with each of the features of one or more of the other dependent claims dependent upon the same independent claim or claims.

What is claimed is:

1. A process for solution polymerizing ethylene, higher alpha-olefin and diene having two polymerizable double bonds, the process comprising:

A) reacting in a first step ethylene, higher alpha-olefin comonomer and optionally one or more dienes to produce a polymer composition comprising from 0 to less than 1 mol % of diene having one or two polymerizable double bonds, in the presence of a catalyst system;

B) reacting in a second step ethylene, higher alpha-olefin comonomer and one or more dienes at least one of which is a diene having two polymerizable double bonds in the presence of a catalyst system, the amount of diene having two polymerizable double bonds being added to the reactor in the second step being more than 50% of the total diene added in the first and second step combined; and C) recovering a polymer product having from 0.02 to 2 mol % of units derived from the diene having two polymerizable double bonds, and a branching index of greater than 0.5;

wherein the catalyst system in one or both steps is vanadium based.

2. A process for solution polymerizing ethylene, higher alpha-olefin and diene having two polymerizable double bonds, the process comprising:

A) reacting in a first step ethylene, higher alpha-olefin comonomer and optionally one or more dienes to produce a polymer composition comprising from 0 to less than 1 mol % of diene having one or two polymerizable double bonds, in the presence of a catalyst system;

B) reacting in a second step ethylene, higher alpha-olefin comonomer and one or more dienes at least one of which is a diene having two polymerizable double bonds in the presence of a catalyst system, the amount of diene having two polymerizable double bonds being added to the reactor in the second step being more than 50% of the total diene added in the first and second step combined; and C) recovering a polymer product having from 0.02 to 2 mol % of units derived from the diene having two polymerizable double bonds, and a branching index of greater than 0.5;

wherein the diene having two polymerizable double bonds comprises vinyl norbornene.

3. The process of claim 2 wherein the polymer product contains 50 to 90 mol % of ethylene derived units, from 0.1 to 0.5 mol % of vinyl norbornene derived units and propylene derived units forms the balance.

4. A process for solution polymerizing ethylene, propylene and diene having two polymerizable double bonds which comprises:

A) reacting in a first step ethylene, propylene and optionally one or more dienes to produce a polymer composition comprising from 0 to less than 1 mol % of diene having two polymerizable double bonds, in the presence of a vanadium based catalyst system;

B) reacting in a second step ethylene, higher alpha-olefin comonomer and diene comprising vinyl norbornene in the presence of the same catalyst system, the amount of vinyl norbornene added in the second step being more than 50% a of the total diene added in the first and second step combined; and C) recovering a polymer product having from 0.1 to 0.5 mol % of units derived from vinyl norbornene and a total of no more than 5 mol % diene derived units, from 50 to 90 mol % ethylene derived units and a balance of propylene derived units; a branching index of greater than 0.7, and a Mooney viscosity of from 15ML to 100 MST.

5. The process of claim 4 wherein 0 to 0.5 mol % of diene is reacted in the first step and only diene having two polymerizable double bonds is reacted in the second step.

6. The process of claim 4 wherein the polymer product has a branching index of greater than 0.9.

7. The process of claim 4 wherein the composition produced in the first step is supplied as a feed stream, with optional added monomer, to the second step in series reactor arrangement.

8. The process of claim 5 wherein each step is conducted in a separate continuous stirred tank reactor and the first step produces at least 80 wt % of the total polymer.

9. The process of claim 5 wherein each step is conducted in a separate continuous stirred tank reactor and the first step produces at least 90 wt % of the total polymer.

10. The process of claim 5 wherein the catalyst system is selected from the group consisting of vanadium tetra chloride/_aluminum sesquichloride and vanadiumoxytrichloride/_sesquichloride catalyst systems.

11. The process of claim 5 wherein a copolymerizable diene containing only one polymerizable double bond, is added in the first step.

* * * * *